(12) United States Patent
Leschinger et al.

(10) Patent No.: US 6,244,635 B1
(45) Date of Patent: Jun. 12, 2001

(54) LATCHING MECHANISM FOR MOUNTING PLATE OF PEDESTAL CLOSURE ASSEMBLY

(75) Inventors: Matthew Leschinger, Wheaton; Lawrence Santo Dolan, Carol Stream; Thomas Potosnak, Streamwood, all of IL (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/394,148

(22) Filed: Sep. 13, 1999

(51) Int. Cl.⁷ .................................................. E05C 19/06
(52) U.S. Cl. ............................... 292/87; 292/80; 292/81; 220/326
(58) Field of Search .................................. 292/80, 87, 83, 292/91; 220/324, 326, 315, 4.26

(56) References Cited

U.S. PATENT DOCUMENTS

| | | | |
|---|---|---|---|
| 4,344,646 | * | 8/1982 | Michel ................................... 292/87 |
| 4,892,978 | | 1/1990 | Axworthy . |
| 5,308,923 | | 5/1994 | Puigcerver et al. . |
| 5,419,435 | * | 5/1995 | Perzan et al. ....................... 292/87 X |
| 5,533,642 | * | 7/1996 | Lafond et al. ........................ 220/326 |
| 5,551,589 | * | 9/1996 | Nakamura ............................ 220/326 |
| 5,577,779 | * | 11/1996 | Dangel ................................... 292/80 |
| 5,860,302 | * | 1/1999 | James .................................... 292/83 |
| 5,931,514 | * | 8/1999 | Chung ................................... 292/89 |

* cited by examiner

Primary Examiner—Teri Pham Luu
(74) Attorney, Agent, or Firm—Jones, Day, Reavis & Pogue

(57) ABSTRACT

A latching mechanism for a pedestal closure assembly has a pair of substantially channel-shaped slots, each slot having two arms, a flanged base and first and second ends. Each flanged base has a cam-like edge and is connected to the second end of each respective slot. The cam-like edge interconnects the upper and lower surfaces of the flanged base. A pair of legs adapted to be received by each slot are also included in the claimed latching mechanism. Each leg has a limiting edge and includes an end portion adapted to limit the motion of the legs when they are received in the respective slots. At least one flexible latch arm adapted to engage the flanged base of at least one of the slots is connected to one of the legs. Each latch arm includes a finger element beyond the end portion of the limiting edge of the leg. The finger element includes an engagement portion which abuts the lower surface of the flanged base of the leg when the leg is received in its respective slot. The finger element has a cam-follower surface which bears against the cam-like edge of the slot which flexes the latch arm allowing the engagement portion to move beyond the cam-like edge of the flanged base of the slot so that the latch arm engages the flanged base. Thus, the slot is configured and dimensioned to slidingly receive each leg. The latching mechanism and the pedestal closure assembly can be constructed of non-metallic material. Each leg of the latching mechanism can contain a spacer bead and a transverse flange, each flexible latch arm can include an integral lip, and each slot can contain a guide rail. All of these are included to keep the legs more firmly secured in the slots when the latching mechanism is engaged. Additionally, the pedestal closure assembly can have a service wire passageway with a channel slot which allows the internal equipment to be worked on without having to interrupt service and without having to unearth the lower housing section.

31 Claims, 7 Drawing Sheets

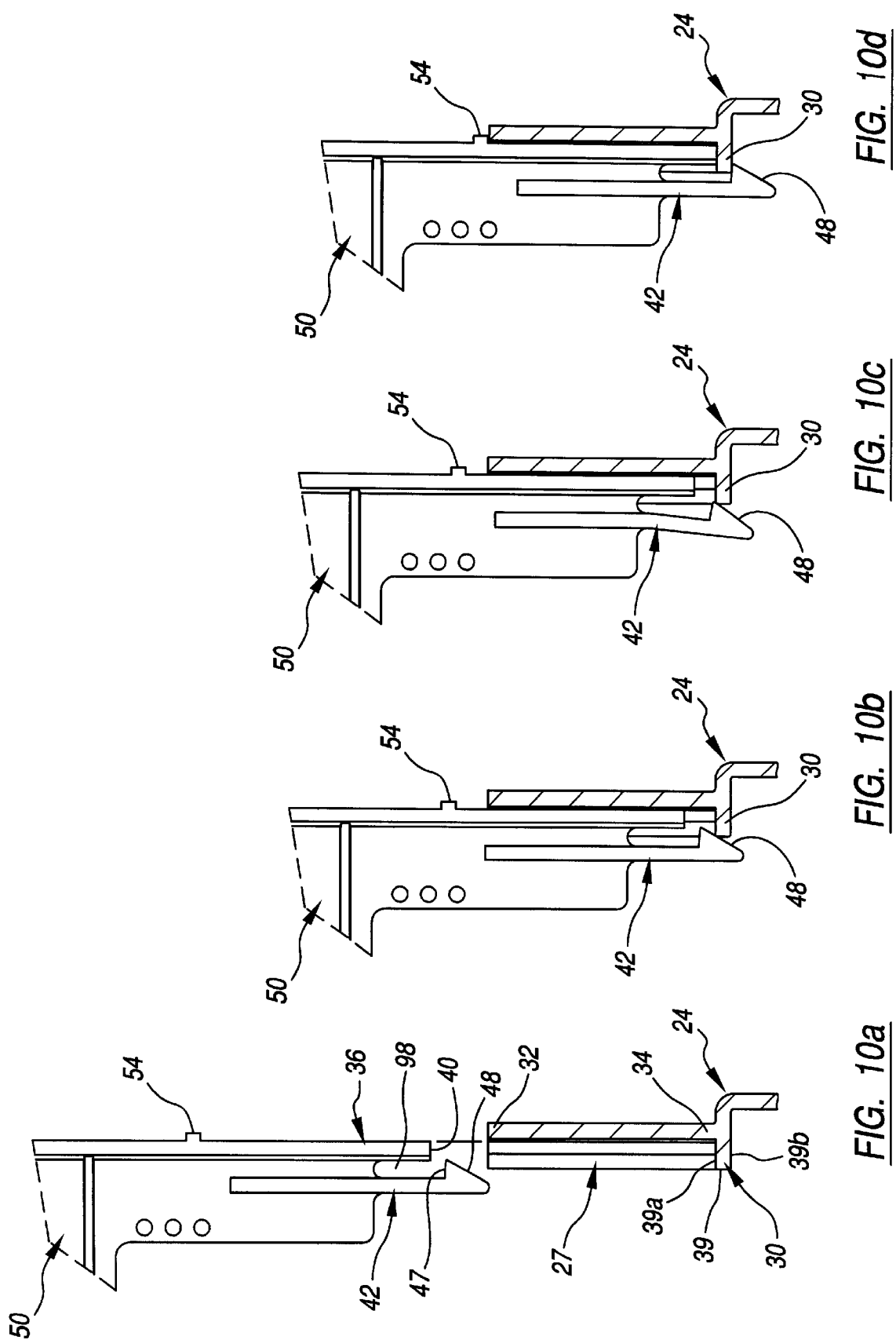

LATCHING MECHANISM FOR MOUNTING PLATE OF PEDESTAL CLOSURE ASSEMBLY

BACKGROUND OF THE INVENTION

1. Field of the Invention

The present invention relates to pedestal closure assemblies for storing power and telecommunications equipment, and more particularly to the latching mechanism which allows the mounting plate to be securely affixed in and manually removed from the interior space of the housing of the pedestal closure assembly.

2. Description of the Related Art

Telecommunications, cable television, power distribution equipment and the like, including primary cable loops, terminal blocks, and connections between a primary cable loop and a terminal block are commonly located out-of-plant and subject to ambient weather conditions. Since the necessary equipment is located outside, a protective covering is required to safeguard the equipment from human interference as well as from the environment. Therefore, such protective covering must provide structural as well as environmental protection.

Typically, the protective covering is produced in the form of a pedestal. The pedestal structure includes a housing with a sufficient volume occupying a small area and placeable in a convenient working orientation for housing the aforementioned equipment. Inside the housing, cable pairs may be interconnected to each other. Such interconnections are made at a connector block which is mounted to a universal mounting plate inside the pedestal closure assembly. The connector block includes a number of terminals and the pairs of wires in the cable are stripped of their insulation and connected to the terminals.

A lower housing section of the housing is recessed and secured in the ground, and has a passageway to permit underground cables to extend therethrough. The cables extend through the lower housing section and are covered by the upper housing section which locks to the lower housing section. The pedestal, when assembled and installed, should have sufficient structural strength to resist minor impacts as well as other environmental conditions such as wind, snow accumulation or precipitation impact.

Presently, commercially available pedestal closure assembly housings and mounting plates are constructed of metal. Many prior art mounting plates are locked permanently into place and have hinges that allow the mounting plate to only be moved back and forth or left to right while attached to the housing. Mounting plates are also presently attached using bayonet slots and lance forms. Also, presently available commercial mounting plates are flat and do not allow for a large number of attachments thereto because of a lack of internal area in the housing. In addition, assemblies are built with a service door located on the front of the assembly to allow servicing of the internal equipment attached to the mounting plate located inside of the assembly. However, the service door of the prior art does not eliminate the need to excavate the lower housing section of the ground in order to allow addition and deletion of connections inside the housing.

The present method of locking the mounting plate into place poses several problems, not the least of which is that the prior art mounting plates are not removable. In addition, the mounting plates attached with a bayonet slip or lance form are not securely attached, and can be easily compromised. Also, the service door can be cumbersome and is not easy to work with. Oftentimes, once the pedestal is implanted into the ground, the service door is located at least partially below ground level, and the pedestal needs to be partially unearthed in order for work to be completed inside the pedestal enclosure. Sometimes, the door can be opened by unauthorized personnel, and the internals of the pedestal closure assembly can be left vulnerable to vandals or the weather.

Additionally, costs of fabricating metal pedestal closure assembly housings and mounting plates is higher than for non-metallic ones. Furthermore, since metal pedestal closure assemblies are relatively heavy, it takes costly and time-consuming labor to install them correctly and securely.

BRIEF SUMMARY OF THE INVENTION

A general object of the present invention is to provide pedestal closure assemblies for storing telecommunications, cable television, power distribution equipment and the like that are lighter and require less labor for installation.

A more specific object of the present invention is to provide a non-metallic mounting plate for pedestal closure assemblies that is easily snapped into place and, at the same time, allows for simple manual disengagement.

An additional object of the present invention is to provide a mounting plate shaped in such a way to allow for an increased amount of equipment to be attached to it.

Yet another object of the present invention is to provide a service wire channel in the housing of the pedestal closure assembly to allow the easy addition and deletion of connections and equipment to and from the mounting plate located inside the housing without having to disassemble the housing itself, and without having to interrupt service while working on the equipment located inside the pedestal closure assembly.

In accordance with the present invention, as embodied and broadly described herein, these objects are achieved by providing a latching mechanism for a pedestal closure assembly having a pair of substantially channel-shaped slots, each slot including two arms, a flanged base and first and second ends. Each flanged base has a cam-like edge and is connected to the second end of each respective slot. The cam-like edge interconnects the upper and lower surfaces of the second end. A pair of legs adapted to be received by each slot are also included in the claimed latching mechanism. Each leg has a limiting edge and includes an end portion adapted to limit the motion of the legs when they are received in the respective slots. At least one flexible latch arm adapted to engage the flanged base of at least one of the slots is connected to one of the legs. Each latch arm includes a finger element that extends beyond the end portion of the limiting edge of the leg. The finger element includes an engagement portion which abuts the lower surface of the flanged base of the leg when the leg is received in its respective slot. The slot is configured and dimensioned to slidingly receive each leg. The finger element has a cam-follower surface which, when sliding the leg into the slots, bears against the cam-like edge of the slot which flexes the latch arm allowing the engagement portion to move beyond the cam-like edge of the flanged base of the slot so that the latch arm engages the flanged base.

One of the advantages of the present invention is that the mounting plate is removeable, and is shaped such that internal cable loops can be stored and secured behind the U-shaped mounting plate.

An additional advantage of the present invention is that the mounting plate is shaped such that splice bars can be secured to the side walls of the mounting plate in several different locations, and that these same engaging points can also be used for cable ties to secure splice bundles.

Another advantage of the invention is that the universal hole pattern of the mounting plate is configured to allow for limitless front mounting block locations as well as limitless rear cable tie securing points.

Additional novel features and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE SEVERAL VIEWS OF THE DRAWING

FIG. 7 is a back elevation view of the mounting plate, showing splice bars and the like;

FIGS. 10(a) through 10(d) are side elevation views of one of the legs being slidingly received into one of the slots.

DETAILED DESCRIPTION OF THE PREFERRED EMBODIMENT

While particular embodiments of the invention will be shown and described in detail below, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

Figure 1:
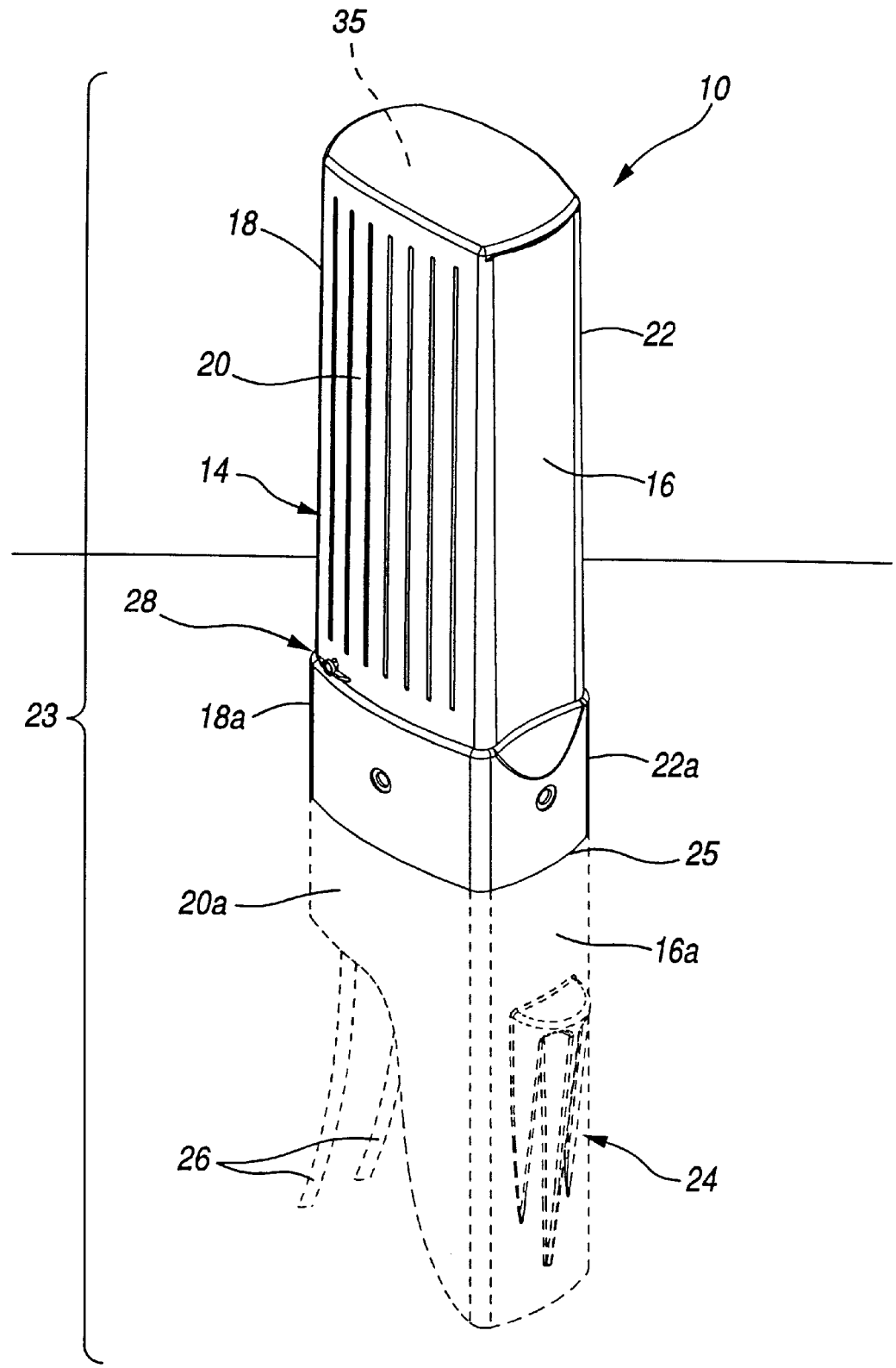
FIG. 1 is a perspective view of a pedestal closure assembly of the present invention.

Referring now to the drawings, a pedestal closure assembly is generally designated by reference numeral 10 and includes an upper housing section 14 with a rear wall 16, a front wall 18, a side wall 20 and a side wall 22. As illustrated in FIG. 1, assembly 10 also includes a lower housing section 24 with a rear wall 16a, a front wall 18a, a side wall 20a and a side wall 22a. The upper housing section 14 and lower housing section 24 are structured and dimensioned for telescopingly nesting to engage upper housing section 14 and lower housing section 24 to form a housing structure 23 having an interior space 35 for protectively accommodating electrical, power supply or telecommunications equipment, and yet allowing easy and quick access to the equipment.

As further illustrated in FIG. 1, the pedestal closure assembly 10 is installed with the lower housing section 24 recessed into a pit or trench in the support medium, such as earth, clay, concrete or the like to an extent represented by the line. For illustrative purposes, a buried multi-pair primary cable 26 is shown extending upwardly from below the pedestal closure assembly 10 through the lower housing section 24 into the housing structure 23.

Figures 2, 2A:
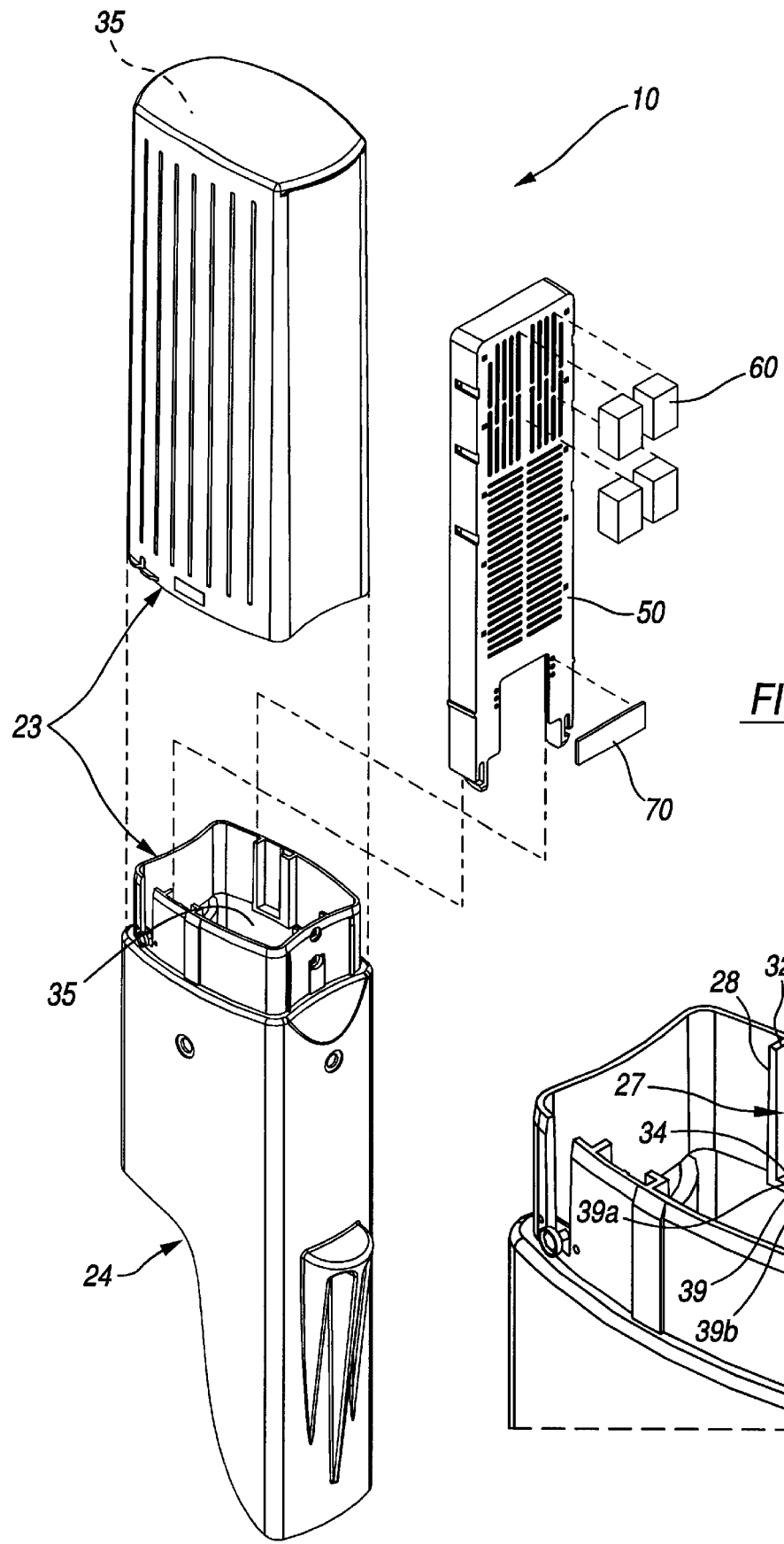
FIG. 2 is an exploded perspective view of the pedestal closure assembly and the mounting plate as illustrated in FIG. 1, clearly showing the latching mechanism.
FIG. 2(a) is a close-up view of the channel-shaped slots depicted in FIG. 2.

With reference to the exploded view of pedestal closure assembly 10 depicted in FIG. 2, electronic interconnection blocks, such as terminal blocks 60, as well as other electronic, power supply and telecommunications equipment and the like, may be retained within the enclosed interior space 35 defined by the housing structure 23 of pedestal closure assembly 10. Also contained within interior space 35 is universal mounting plate 50 upon which one or more terminal blocks 60 and the like are mounted. Also affixed to mounting plate 50 is conductive metal grounding bracket 70 which enables the electrical equipment connected to terminal blocks 60 to be electrically grounded.

Substantially channel-shaped slots 27, as well as their two arms 28, lips 29, flanged base 30, first end 32 and second end 34 are attached to the lower housing section 24 as shown generally in FIG. 2, and more closely in FIG. 2a. Each lip 29 is integral with one arm 28 of each respective slot 27 for further restraining each leg 36 when each respective leg 36 is received in each respective slot 27. Cam-like edge 39 of the flanged base 30 can also be seen in FIG. 2a. The cam-like edge 39 interconnects the upper surface 39a and lower surface 39b of second end 34 of the channel-shaped slots 27.

Figure 3:
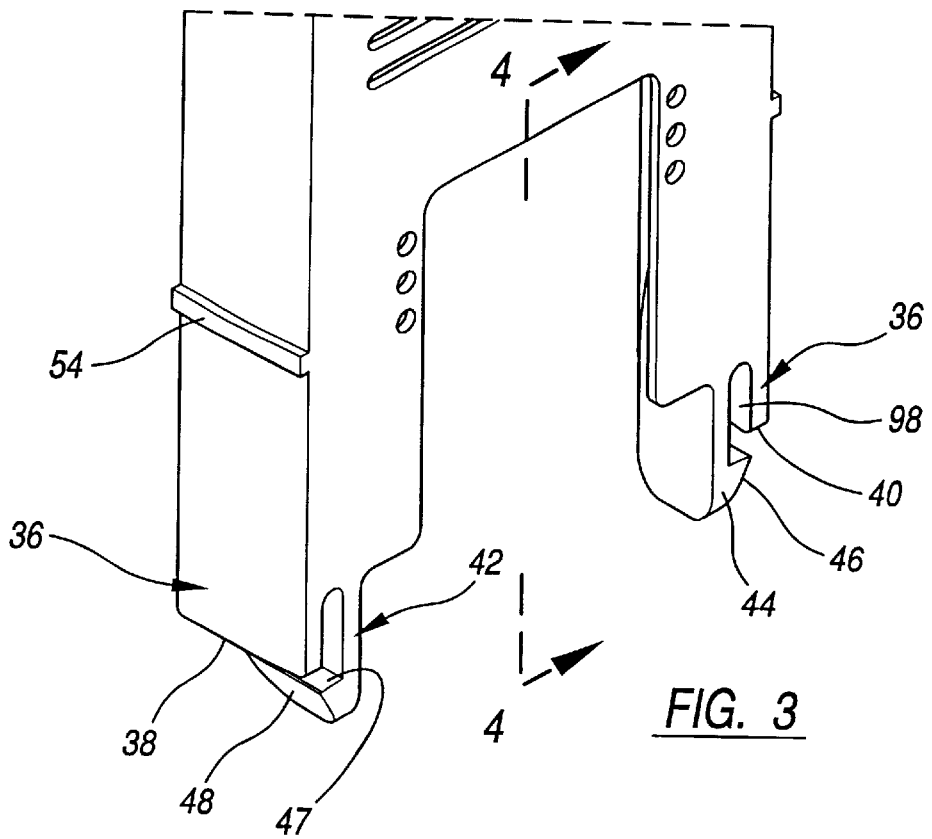
FIG. 3 is a close-up perspective view of the legs and latch arms of the mounting plate.

FIG. 3 shows the pair of legs 36 that are adapted to be received by the slots 27. Each leg 36 has a limiting edge 38 with an end portion 40 adapted to limit the motion of the legs 36 relative to the slots 27. A flexible latch arm 42 adapted to engage the flanged base 30 of the slot 27 is connected to each leg 36. Flexible arm 42 is separated from leg 36 by open space 98. Flexible arm 42 includes a finger element 44 with an engagement portion 46 that extends beyond the end portion 40 of the limiting edge 38. As shown in FIGS. 10(a) through 10(d), the engagement portion 46 has a cam-follower surface 48 which, when the legs of being slidingly received by slots 27, bears against cam-like edge 39 of slot 27, thereby flexing latch arm 42 and allowing the engagement portion 46 to move beyond cam-like edge 39 of flanged base 30 so that latch arm 42 engages flanged base 30 of slot 27. This allows engagement portion 46 to abut lower surface 39b of second end 34 of slot 27 when legs 36 are received in slots 27.

Figures 4, 5:
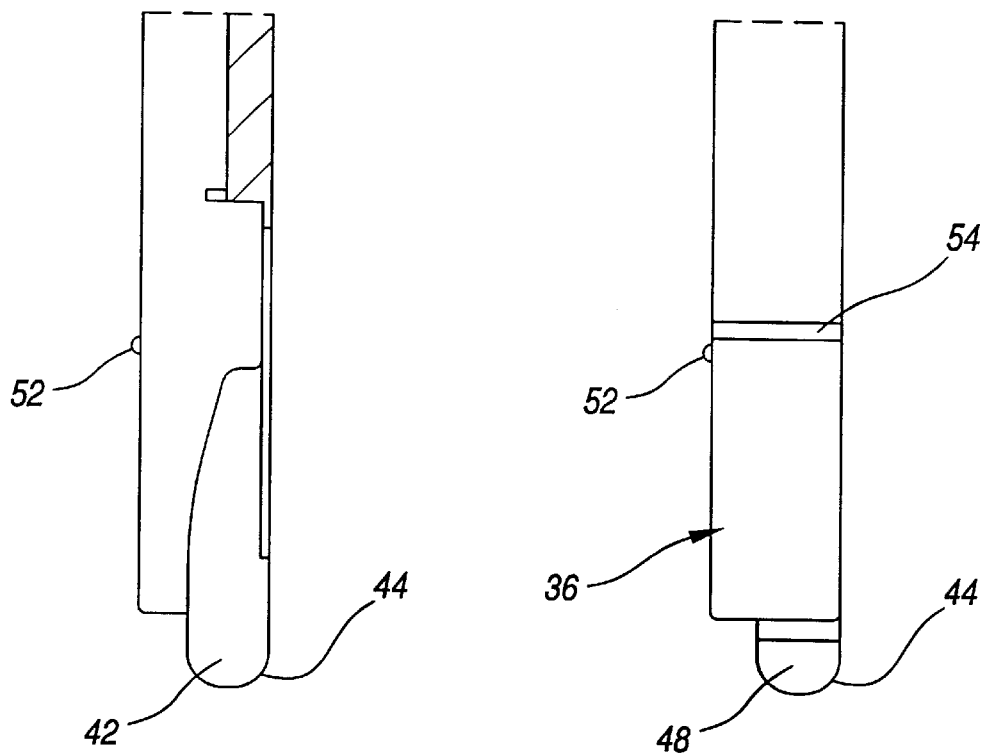
FIG. 4 is a side elevation view of a leg included in FIG. 3 along line 4—4.
FIG. 5 is a side elevation view of the other leg in FIG. 3.

In a preferred embodiment of the pedestal closure assembly claimed herein, the latching mechanism and the assembly would be constructed of non-metallic material. Additionally, legs 36 are substantially L-shaped for increased support of mounting plate 50. Engagement portion 46 includes ledge 47 which abuts lower surface 39b of flanged base 30 when leg 36 is received in slot 27. Also, included in a preferred embodiment is a spacer bead 52 which is shown in FIG. 5. Connected to leg 36, spacer bead 52 helps to maintain a snug fit between leg 36 and slot 27. Additionally, in the preferred embodiment, transverse flange 54 is connected to each leg 36 in order to limit movement of leg 36 relative to slot 27, and guide rail 75 (shown in FIG. 6) is mounted to each of slot 27 for further constraining legs 36 in slots 27 when legs 36 are received in their respective slots 27.

Figure 7:
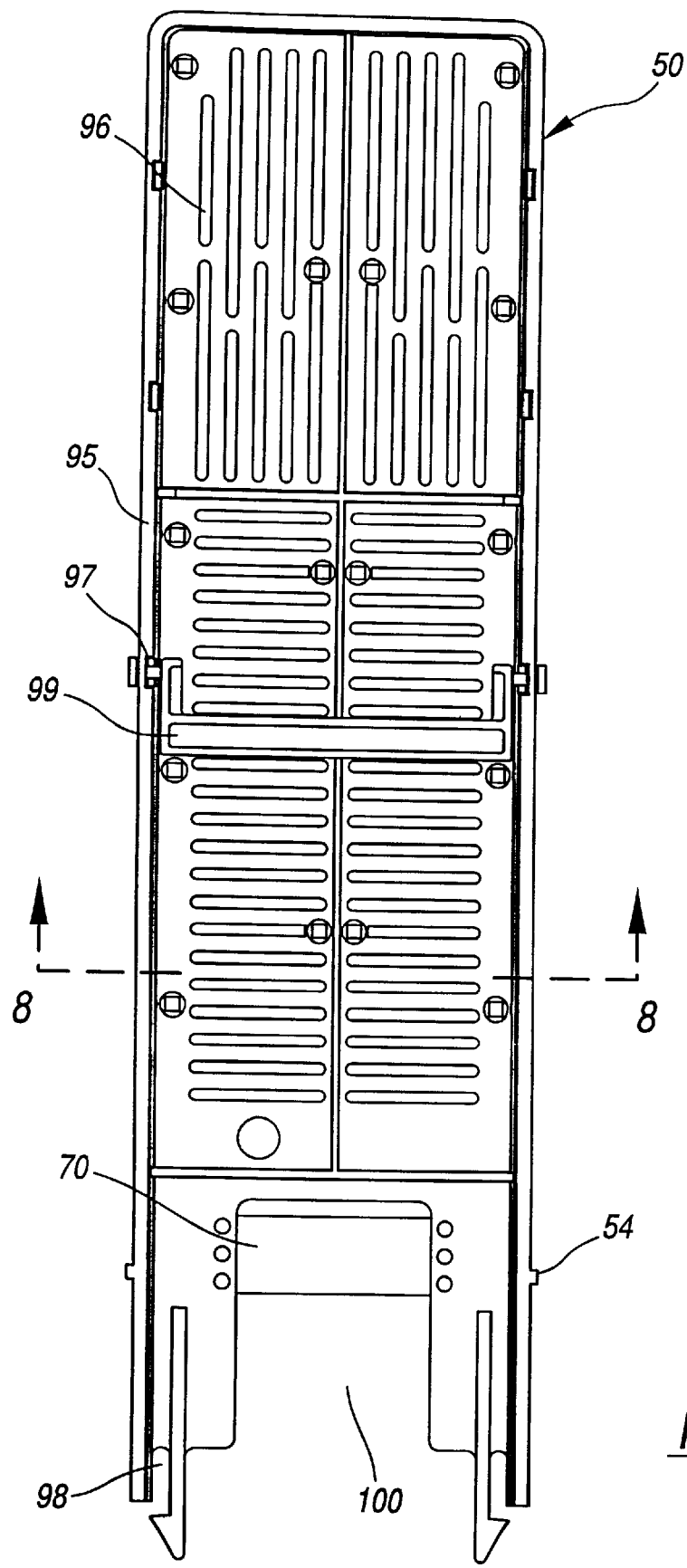
Figure 8:
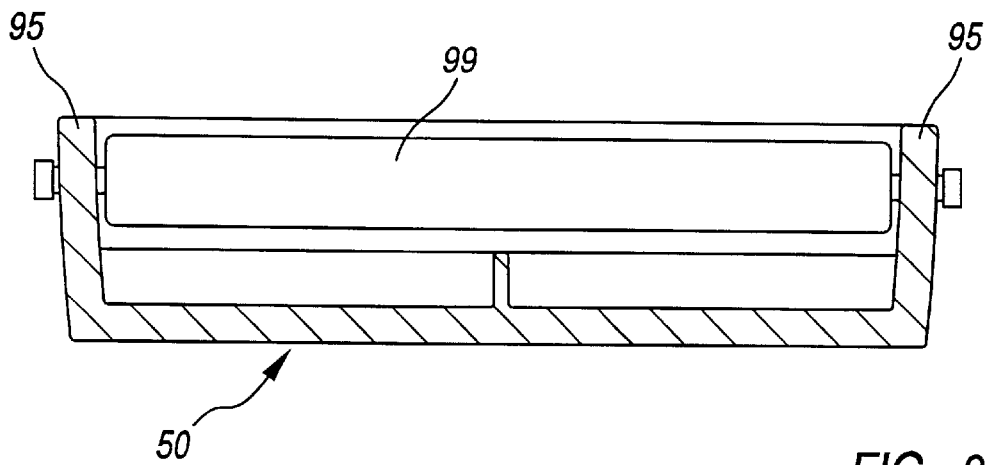
FIG. 8 is a back section of the mounting plate taken along line 8—8.
Figure 9:
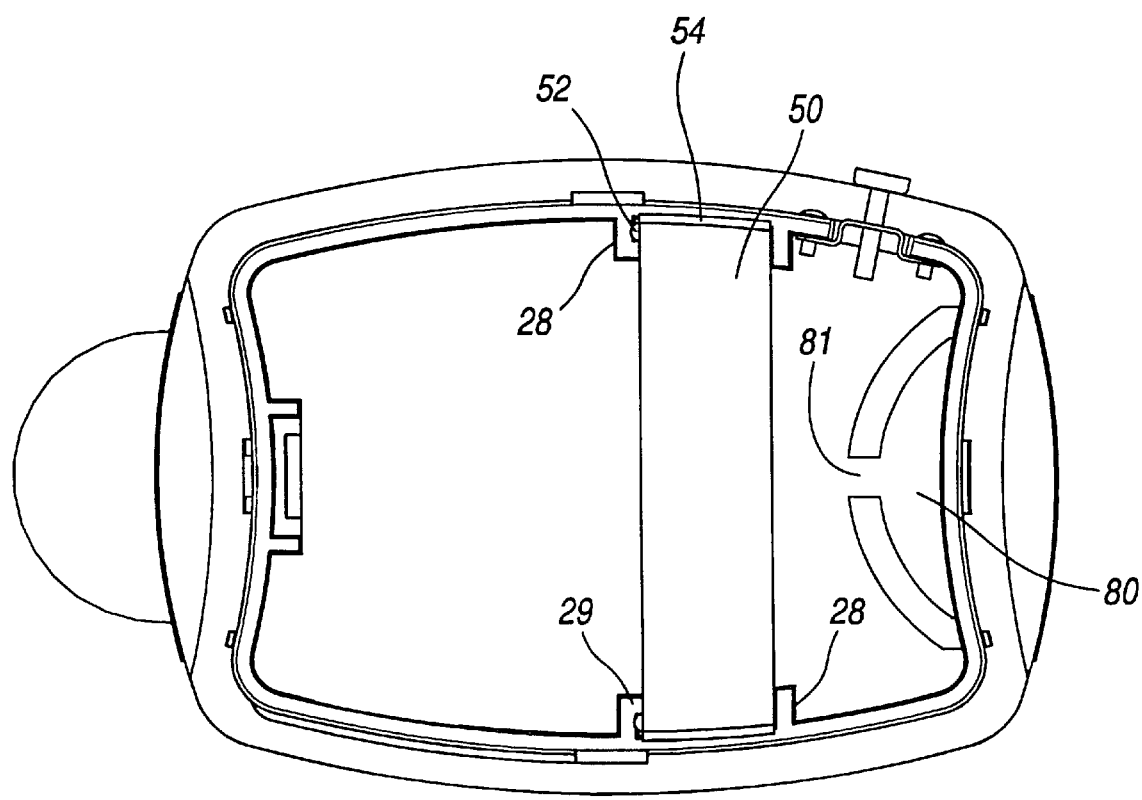
FIG. 9 is a top plan view of the mounting plate locked into place showing the service wire channel.

In addition, mounting plate 50 of the preferred embodiment is shaped like a "U," and open area 100 is included as shown in FIGS. 7 and 8. This allows any cable loops contained in assembly 10 to be stored and secured at the rear of assembly 10 for added protection. Additionally, this shape allows splice bars 99 to be secured to engagement points 97 in side walls 95 of mounting plate 50. These same engagement points can be used for cable ties to secure any splice bundles. Universal hole pattern 96 on the face of mounting plate 50 allows for limitless front locations for mounting terminal blocks, as well as allowing for limitless cable tie securing points in the rear of mounting plate 50.

Also, in the preferred embodiment, open area 100 at the bottom of mounting plate 50 allows one to loop, for example, cable attached to terminal block 60 to the rear of mounting plate 50 for splicing to the main cable. Grounding bracket 70 is also located in this area. Open area 100 and the "U" shape of the mounting plate allows for all of the pedestal functions to coexist without interruption.

Figure 6:
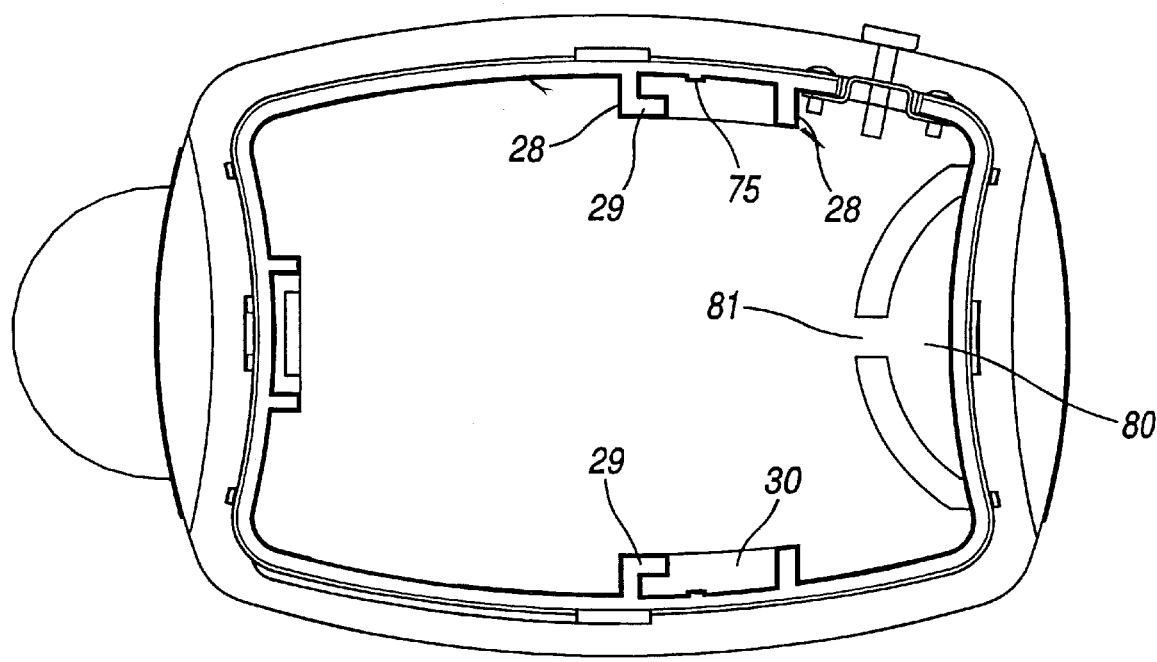
FIG. 6 is a top plan view of the channel-shaped slots and the service wire passageway.

Additionally, in order to allow the mounting of additional wires and terminal blocks mounted on mounting plate 50 in interior space 35 without having to remove lower housing section 24 from the grounding medium, the preferred embodiment of pedestal closure assembly 10 includes service wire passageway 80 as shown in FIG. 6. Passageway 80 is formed by an arcuately shaped wall connected to the housing, preferably connected to the lower housing section 24. Passageway 80 includes channel slot 81 for further enhancing the ease with which additional wires can be mounted to terminal blocks 60.

What is claimed is:

1. A latching mechanism for an enclosure comprising:
   a pair of substantially channel-shaped slots, each of the slots having two arms, a flanged base and first and second ends;
   the flanged bases of the slots being connected to the respective second ends of each of the slots, each of the flanged bases having a cam-like edge interconnecting the upper and lower surfaces thereof;
   a pair of legs adapted to be received by the slots, each of the legs having a limiting edge including an end portion adapted to limit motion of the legs relative to the slots;
   at least one flexible latch arm, the arm being connected to a first one of the legs, the latch arm being adapted to engage the flanged base of the first one of the slots, the latch arm including a finger element beyond the end portion of the limiting edge of the first leg, the finger element including an engagement portion having a cam-follower surface, the engagement portion abutting the lower surface of the flanged base of the first leg when the leg is received in the first slot; and
   the slots are configured and dimensioned to slidingly receive each of the legs so that when the slots, the legs and the at least one latch arm are engaged, the cam-follower surface of the at least one arm bears against the cam-like edge of the first slot flexing the latch arm allowing the engagement portion to move beyond the cam-like edge of the flanged base of the first one of the slots so that the latch arm engages the flanged base of the first slot.

2. An apparatus as claimed in claim 1 wherein the latching mechanism is constructed of non-metallic material.

3. An apparatus as claimed in claim 1 wherein the legs are substantially L-shaped.

4. An apparatus as claimed in claim 1 wherein the engagement portion includes a ledge which abuts the lower surface of the flanged base when the leg is received in the first slot.

5. An apparatus as claimed in claim 1 including:
   a spacer bead connected to each of the legs for helping to maintain a snug fit between the legs and the slots.

6. An apparatus as claimed in claim 1 including:
   a transverse flange connected to each of the legs for limiting movement of the legs relative to the slots.

7. An apparatus as claimed in claim 1 including:
   a lip integral with one of the arms of each respective slot for further restraining the legs in the slots when each respective leg is received in each respective slot.

8. An apparatus as claimed in claim 1 including:
   a guide rail mounted to each of the slots for further constraining the legs in the slots when each respective leg is received in each respective slot.

9. An apparatus as claimed in claim 8 including:
   a lip integral with one of the arms of each respective slot for further restraining the legs in the slots when each respective leg is received in each respective slot;
   a transverse flange connected to each of the legs for limiting movement of the legs relative to the slots; and
   a spacer bead connected to each of the legs for helping to maintain a snug fit between the legs and the slots.

10. A latching mechanism for an enclosure comprising:
    a pair of substantially channel-shaped slots, each of the slots having two arms, a flanged base and first and second ends;
    the flanged bases of the slots being connected to the respective second ends of each of the slots, each of the flanged bases having a cam-like edge interconnecting the upper and lower surfaces thereof;
    a pair of legs adapted to be received by the slots, each of the legs having a limiting edge including an end portion adapted to limit motion of the legs relative to the slots;
    a pair of flexible latch arms, each of the arms connected to a respective
    leg, each of the latch arms being adapted to engage each respective flanged base, and each of the latch arms including a finger element extending beyond the end portion of the limiting edge of the leg, the finger element including an engagement portion having a cam-follower surface, each engagement portion abutting the lower surface of each respective flanged base when the legs are received in the slots; and
    each of the slots is configured and dimensioned to slidingly receive each respective leg so that when the slots, the legs and the latch arms are engaged, each of the cam-follower surfaces bears against the cam-like edge of each respective slot flexing the latch arms allowing each engagement portion to move beyond the cam-like edge of each respective flanged base so that each latch arm engages each respective flanged base.

11. An apparatus as claimed in claim 10 wherein the latching mechanism is constructed of non-metallic material.

12. An apparatus as claimed in claim 10 wherein the legs are substantially Lshaped.

13. An apparatus as claimed in claim 10 wherein the engagement portion includes a ledge which abuts the lower surface of the flanged base when the leg is received in the first slot.

14. An apparatus as claimed in claim 10 including:

a spacer bead connected to each of the legs for helping to maintain a snug fit between the legs and the slots.

15. An apparatus as claimed in claim 10 including:

a transverse flange connected to each of the legs for limiting movement of the legs relative to the slots.

16. An apparatus as claimed in claim 10 including:

a lip integral with one of the arms of each respective slot for further restraining the legs in the slots when each respective leg is received in each respective slot.

17. An apparatus as claimed in claim 10 including:

a guide rail mounted to each of the slots for further constraining the legs in the slots when each respective leg is received in each respective slot.

18. An apparatus as claimed in claim 17 including:

a lip integral with one of the arms of each respective slot for further restraining the legs in the slots when each respective leg is received in each respective slot;

a transverse flange connected to each of the legs for limiting movement of the legs relative to the slots; and a spacer bead connected to each of the legs for helping to maintain a snug fit between the legs and the slots.

19. A pedestal closure assembly comprising:

an openable housing, said housing defining an interior space;

a mounting plate connected to the housing and located in the interior space;

a latching mechanism for connecting the plate to the housing comprising:

a pair of substantially channel-shaped slots, each of the slots having two arms, a flanged base and first and second ends;

the flanged bases of the slots being connected to the respective second ends of each of the slots, each of the flanged bases having a cam-like edge interconnecting the upper and lower surfaces thereof;

a pair of legs adapted to be received by the slots, each of the legs having a limiting edge including an end portion adapted to limit motion of the legs relative to the slots;

at least one flexible latch arm, the arm being connected to a first one of the legs, the latch arm being adapted to engage the flanged base of the first one of the slots, the latch arm including a finger element beyond the end portion of the limiting edge of the first leg, the finger element including an engagement portion having a cam-follower surface, the engagement portion abutting the lower surface of the flanged base of the first leg when the leg is received in the first slot; and the slots are configured and dimensioned to slidingly receive each of the legs so that when the slots, the legs and the at least one latch arm are engaged, the cam-follower surface of the at least one arm bears against the cam-like edge of the first slot flexing the latch arm allowing the engagement portion to move beyond the cam-like edge of the flanged base of the first one of the slots so that the latch arm engages the flanged base of the first slot.

20. The pedestal closure assembly of claim 19 wherein said assembly and said latching mechanism are constructed of non-metallic material.

21. The pedestal closure assembly of claim 19 wherein the legs are substantially L-shaped.

22. The pedestal closure assembly of claim 19 wherein the engagement portion includes a ledge which abuts the lower surface of the flanged base when the leg is received in the first slot.

23. The pedestal closure assembly of claim 19 including:

a spacer bead connected to each of the legs for helping to maintain a snug fit between the legs and the slots.

24. The pedestal closure assembly of claim 19 including:

a transverse flange connected to each of the legs for limiting movement of the legs relative to the slots.

25. The pedestal closure assembly of claim 19 including:

a lip integral with one of the arms of each respective slot for further restraining the legs in the slots when each respective leg is received in each respective slot.

26. The pedestal closure assembly of claim 19 including:

a guide rail mounted to each of the slots for further constraining the legs in the slots when each respective leg is received in each respective slot.

27. The pedestal closure assembly of claim 26 including:

a lip integral with one of the arms of each respective slot for further restraining the legs in the slots when each respective leg is received in each respective slot;

a transverse flange connected to each of the legs for limiting movement of the legs relative to the slots; and a spacer bead connected to each of the legs for helping to maintain a snug fit between the legs and the slots.

28. The pedestal closure assembly as claimed in claim 19 further comprising a service wire passageway formed in the interior space, the passageway for aiding the mounting of additional wires onto an electronic interconnection block mounted on the mounting plate.

29. The pedestal closure assembly as claimed in claim 28 wherein said passageway is formed by an arcuately shaped wall connected to said housing.

30. The pedestal closure assembly as claimed in claim 29 wherein said wall is integrally formed with said housing.

31. The pedestal closure assembly as claimed in claim 30 wherein said integral service wire channel contains a channel slot to allow for servicing equipment located in said enclosed interior space without having to disconnect the wires attached to the internal equipment.

\* \* \* \* \*